UNITED STATES PATENT OFFICE.

JAMES GAMAGE TARR AND AUGUSTUS H. WONSON, OF GLOUCESTER, MASS.

IMPROVED PAINT FOR THE BOTTOMS OF SHIPS.

Specification forming part of Letters Patent No. 48,323, dated June 20, 1865; Reissue No. 2,428, dated December 18, 1866.

*To all whom it may concern:*

Be it known that we, JAMES GAMAGE TARR and AUGUSTUS HENRY WONSON, both of Gloucester, in the State of Massachusetts, have invented certain new and useful Improvements in Paint; and we do hereby declare that the following is a full, clear, and exact description thereof and of the method of compounding the same.

The object of our improvements is to protect surfaces of wood or other material from the depredations of marine animals and insects, and to prevent the growth or adhesion of any shell-fish or vegetable growth whatever, so as to preserve a smooth surface. We effect complete protection in this way by the use of our improved paints, which are to be applied to all surfaces exposed to water, by means of a brush, in the usual way; and our improvements consist in the mixture of certain metallic oxides with a proper medium or vehicle in such manner as to constitute a durable paint capable of being so applied. The medium which we prefer to use for this purpose is obtained by mixing wood-tar with benzine or naphtha. Into a vat or tank of suitable size we pour forty gallons of Stockholm tar, and mix with this thirty gallons of benzine or naphtha, which must be added gradually, a few gallons at a time, and rapidly stirred. When the naphtha or benzine is all put in, the mixture should be stirred for about half an hour, or until the ingredients are well incorporated. The vat must then be closed with a tight-fitting cover and allowed to stand for about twenty-four hours, during which time a deposit takes place, the residuum consisting principally of heavy matters that are not soluble in benzine or naphtha, the quantity thus deposited being equal to about one gallon to every ten gallons of the mixture. The liquid part is drawn off into another vat, and constitutes a medium which we try on a glass pane for consistency, and modify, if necessary, the proportion of naphtha to make it generally suitable for the manufacture of our paint, as we now proceed to describe.

To form a barrel (forty-two and one-half gallons) of our improved paint, we take one hundred and seventy quarts of this medium and add sixty-three pounds of dry ocher or burned iron ore, and mix carefully by stirring, or by a mill. To this mixture we add one hundred and seventy pounds of native or artificial oxide of copper and sixty-three pounds of oxide of arsenic (called "white arsenic") and thoroughly mix the whole, when it is ready for use as a paint. The oxide of copper which we prefer is that produced by the mixture of suboxide of copper and protoxide of copper. In order to aid the solution of the oxide of copper in sea-water, we find a small proportion of oxide of zinc to be useful, such a proportion as is found in the mixed oxide formed from the calcining of brass or yellow metal, which mixed oxide contains about two parts oxide of copper to one part oxide of zinc, and may be used in lieu of corresponding portions of the pure oxides of copper and of zinc. The rapidity of solution of the oxides promoting the cleanliness of a ship's bottom, the use of the oxide of zinc will be found most desirable when a vessel is to be employed for a short voyage, and her paint can be soon renewed.

The oxide of arsenic may be dispensed with where the painted surface is not to be exposed to marine vegetable growth, as this element of the paint we have described is specially useful on account of its poisonous action upon vegetable life. When either oxide of zinc or oxide of arsenic is dispensed with, the oxide of copper should of course be proportionately increased.

We have described the medium which we have found most suitable for the general purposes of painting ships' bottoms, but do not wish to be understood as limiting our invention thereby. The office of the medium being simply to dissolve and hold suspended the metallic matters before mentioned, it is evident that other known media may be used instead of that specially described, if they are of such a character as to properly dissolve and hold suspended such metallic matters and not interfere with their intended action by corrosion. Thus, in lieu of the wood-tar, coal-tar may be used, and particularly in fresh water, on account of its greater varnish-like character, or the residuary products of the distillation of palm-oil, which has a tarry character, fitting it for this use. So, in regard to the ocher, we have specially described the burned iron ore; but we desire to include herein the equivalents of that ocher for the purpose described, which is to give hardness and compactness to the whole mixture to withstand the abrasion to which it is subject in wear, and to retard the solution of the oxides; and accordingly the proportion of the ocher employed may vary considerably, according to the length and character of the wear for which the paint in a given case is designed.

Of course greater or less variations from the proportions of the oxides employed may be practiced, so long as their essential operation in combination, as before described, is preserved.

In the paint made as described we have a covering which will slowly dissolve, so as to form a poisonous film on its surface repulsive to animal and vegetable life, and such solution, as it goes on, insures a smooth surface, which does not retard rapid motion through water.

When our paint is applied to an iron or other rough surface, it is desirable that the surface be first coated with the medium to be used.

What we claim as our invention is—

1. The composition of paint, consisting of oxide of copper, oxide of zinc, and oxide of arsenic, used with a basis of ocher and a suitable medium, substantially as described.

2. The composition of paint, consisting of oxide of copper and oxide of zinc used with a basis of ocher, and a suitable medium, substantially as described.

3. The composition of paint, consisting of oxide of copper and oxide of arsenic, and with a basis of ocher and a suitable medium, substantially as described.

JAMES GAMAGE TARR.
AUGUSTUS H. WONSON.

Witnesses:
CYRUS STORY,
WM. A. KING.